United States Patent [19]
Howarth et al.

[11] Patent Number: 5,748,324
[45] Date of Patent: May 5, 1998

[54] BICHROMATIC METHOD AND APPARATUS FOR DETECTING PEACH PIT FRAGMENTS

[75] Inventors: M. Scott Howarth, Pueblo, Colo.; Robin D. Tillett; Christine R. Bull, both of Bedfordshire, England

[73] Assignee: Atlas Pacific Engineering Company, Pueblo, Colo.

[21] Appl. No.: 502,679

[22] Filed: Jul. 14, 1995

[51] Int. Cl.$^6$ .................. G01J 3/46; B07C 5/00
[52] U.S. Cl. .............. 356/425; 356/448; 209/542; 209/587; 209/920; 209/938; 250/226; 198/382
[58] Field of Search ..................... 209/576, 577, 209/580, 581, 587, 938, 939, 540, 541, 542, 543, 544, 545, 920, 921; 198/382; 356/407, 425, 448; 250/226, 560

[56] References Cited

U.S. PATENT DOCUMENTS

| | | | |
|---|---|---|---|
| 3,666,079 | 5/1972 | Anderson et al. | 198/386 |
| 3,910,416 | 10/1975 | Payne | 209/74 |
| 4,131,540 | 12/1978 | Husome et al. | 209/582 |
| 4,146,135 | 3/1979 | Sarkar et al. | 209/580 |
| 4,260,062 | 4/1981 | Lockett | 209/582 |
| 4,300,689 | 11/1981 | Franklin et al. | 209/524 |
| 4,325,256 | 4/1982 | Horn | 73/607 |
| 4,666,045 | 5/1987 | Gillespie et al. | 209/585 |
| 4,878,582 | 11/1989 | Codding | 209/580 |
| 4,909,930 | 3/1990 | Cole | 209/587 X |
| 5,077,477 | 12/1991 | Stroman et al. | 250/349 |
| 5,265,732 | 11/1993 | Long | 209/580 |
| 5,345,081 | 9/1994 | Rogers | 250/338.1 |

FOREIGN PATENT DOCUMENTS

| | | | |
|---|---|---|---|
| 5169037 | 7/1993 | Japan | 209/587 |

*Primary Examiner*—Tuan Nguyen
*Attorney, Agent, or Firm*—Bruce H. Johnsonbaugh

[57] ABSTRACT

A method and apparatus are provided for detecting the presence of pit fragments as small as 2 mm$^2$ in pitted peach halves. Pitted peach halves are agitated into a cup-up position, are conveyed to a position adjacent an inspection zone and are launched airborne into the inspection zone. Each peach half in the inspection zone is illuminated by a pair of quartz halogen lights and the diffusely reflected light is separated into first and second beams. The first and second beams are filtered to extract a first relatively wide wavelength band centered at 600 nm and a second relatively wide wavelength band centered at 750 nm. Preferably, each wavelength band is approximately 70 nm. Each of the wavelength bands enters a separate line scan camera for acquiring image signals from each wavelength band. The signals from both cameras are combined and enhanced to determine the presence or absence of fragments.

18 Claims, 6 Drawing Sheets

BICHROMATIC METHOD AND APPARATUS FOR DETECTING PEACH PIT FRAGMENTS

BACKGROUND

This invention relates generally to a pit fragment detector and, more particularly, to a method and apparatus utilizing a bichromatic technique for detecting peach pit fragments in pitted peach halves.

Detectors are known in the prior art for determining the presence of pit fragments in peach halves prior to canning. For example, the Sarkar et al U.S. Pat. No. 4,146,135 dated Mar. 27, 1979 teaches such an apparatus. However, the Sarkar apparatus has several serious drawbacks. The first serious drawback is that the peach halves slide downwardly across a viewing plate. The optical beam path must pass upwardly through the viewing plate and pass through any debris, such as peach juice, flesh and possibly pit fragments, that collect on the viewing plate. That design inherently causes unwanted debris in the optical path which adversely affects viewing of peaches passing across the viewing plate. The Sarkar patent also teaches the use of very narrow wavelength bands, preferably centered at 730 nm and 940 nm. The Sarkar apparatus uses either LEDs to produce extremely narrow bandwidths, as taught at column 6, lines 54-67, or incandescent bulbs with filters, as taught at column 7, lines 5-11. In either event, the total amount of light available to the sensors is limited. The combination of a relatively low amount of light available and an optical path which inherently will accumulate debris are serious drawbacks to the Sarkar design. Additional drawbacks of the Sarkar teaching are that the light sources must be energized and de-energized every cycle and the system relies upon sequential scanning. Taken together, the above-identified aspects of the Sarkar teaching limit the overall speed and reliability of the apparatus. The design is limited to the speed at which a peach will slide across the viewing plate and by the sequential operation of the light sources and scanning.

Another prior art teaching is the Gillespie et al U.S. Pat. No. 4,666,045 dated May 19, 1987 which attempts to determine the presence of pit fragments by transmitting light completely through the fruit. By choosing an optical path which must pass completely through the fruit, the Gillespie teaching inherently limits the detection of relatively small fragments.

BRIEF SUMMARY OF THE INVENTION

In accordance with the present invention, pitted peach halves are oriented into a "cup-up" position wherein the pit cavity of each peach half is directed upwardly. The peach halves so oriented are conveyed at a relatively high speed to an inspection zone or station where they are illuminated. The diffusely reflected light is separated and filtered into two relatively wide wavelength bands. The difference in reflectivity between pit fragments and either the peach flesh or the peach skin is sensed by each of the two wavelength bands. The images sensed are enhanced by combining the signals.

According to the present invention, peaches can be presented to the inspection station at approximately 45 peaches per second and pit fragments as small as 2 mm$^2$ can be reliably detected.

A primary object of the invention is to provide a method and apparatus for rapidly and reliably detecting pit fragments in pitted peach halves.

Another object of the invention is to provide a bichromatic system of detecting peach pit fragments wherein the peach half is presented in a "cup-up" orientation and wherein two relatively wide wavelength bands of light are utilized to reliably detect either the presence or absence of pit fragments.

Yet another object of the invention is to provide a peach pit fragment detector wherein pitted peach halves are oriented into a "cup-up" position and wherein the pit cavity is illuminated by a pair of spaced apart lights to minimize the presence of shadows in the cavity.

Another object of the invention is to provide a pit fragment detector wherein the optical path utilized by the detector remains inherently clear of debris, that is the optical path is designed to inherently avoid the unwanted presence in the path of juice or other debris.

Another object is to provide an inspection zone wherein the background is air; the peach halves are launched off the end of the conveyor into the inspection zone to avoid background signals otherwise created by a conveying mechanism.

Other objects and advantages of the invention will become apparent from the following description and the drawings wherein:

DETAILED DESCRIPTION OF THE DRAWINGS

Figure 1:
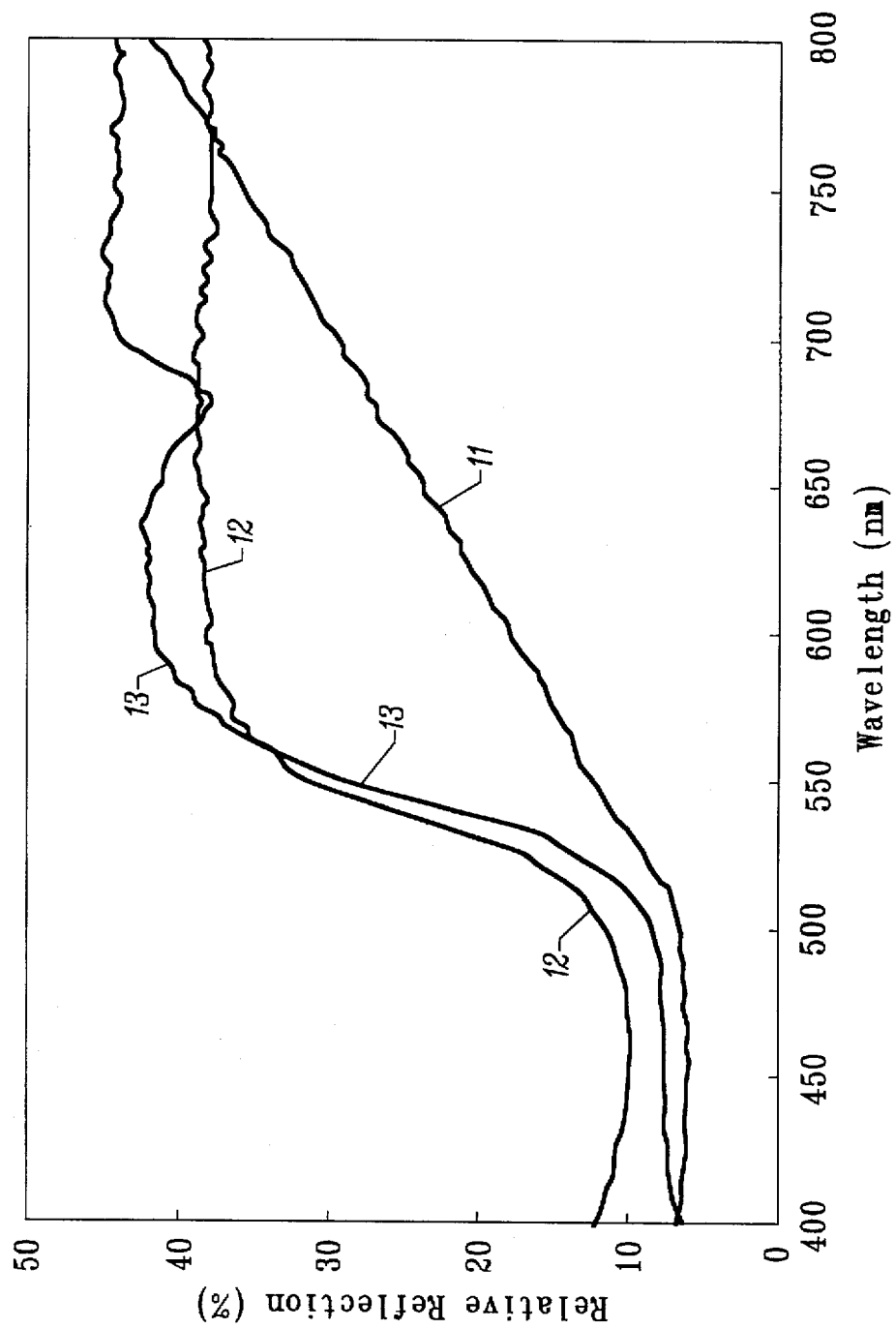
FIG. 1 is a graphical representation showing the difference in relative reflectivity of peach pit fragments, peach flesh and peach skin.

FIG. 1 is a reflectance diagram wherein the relative reflection of an illuminating light beam is expressed as a percentage on the y or vertical axis. The horizontal or x axis shows the wavelength of the incident light in nanometers. Line 11 depicts the relative reflectance of the peach pit as a function of incident wavelength. Line 12 represents the reflectivity of the peach flesh as a function of wavelength and line 13 represents the reflectivity of the peach skin in the range of 400 to 800 nanometers. The graph of FIG. 1 shows approximate relative reflectance.

A fundamental principle of the present invention is to take the fullest possible advantage of the differential reflectivities of the peach pit or pit fragments versus relative reflectivity of the peach flesh or peach skin. A further important principle is to present as much light as possible to the imaging cameras. As described in greater detail below, two wavelength bands are utilized, the first being centered at 600 nm having a wavelength band of up to 100 nm extending from 550 to 650 nm. The second wavelength band is centered at 750 nm and has a bandwidth of 100 nm extending from 700 to 800 nm. A preferred pair of wavelength bands is a first band centered at 600 nm having a bandwidth of 70 nm and a second band centered at 750 nm having a bandwidth of 70 nm. Narrower bandwidths can be used according to the present invention but those narrower bandwidths allow considerably less light to pass through the filters used and into the imaging cameras.

Figure 2:
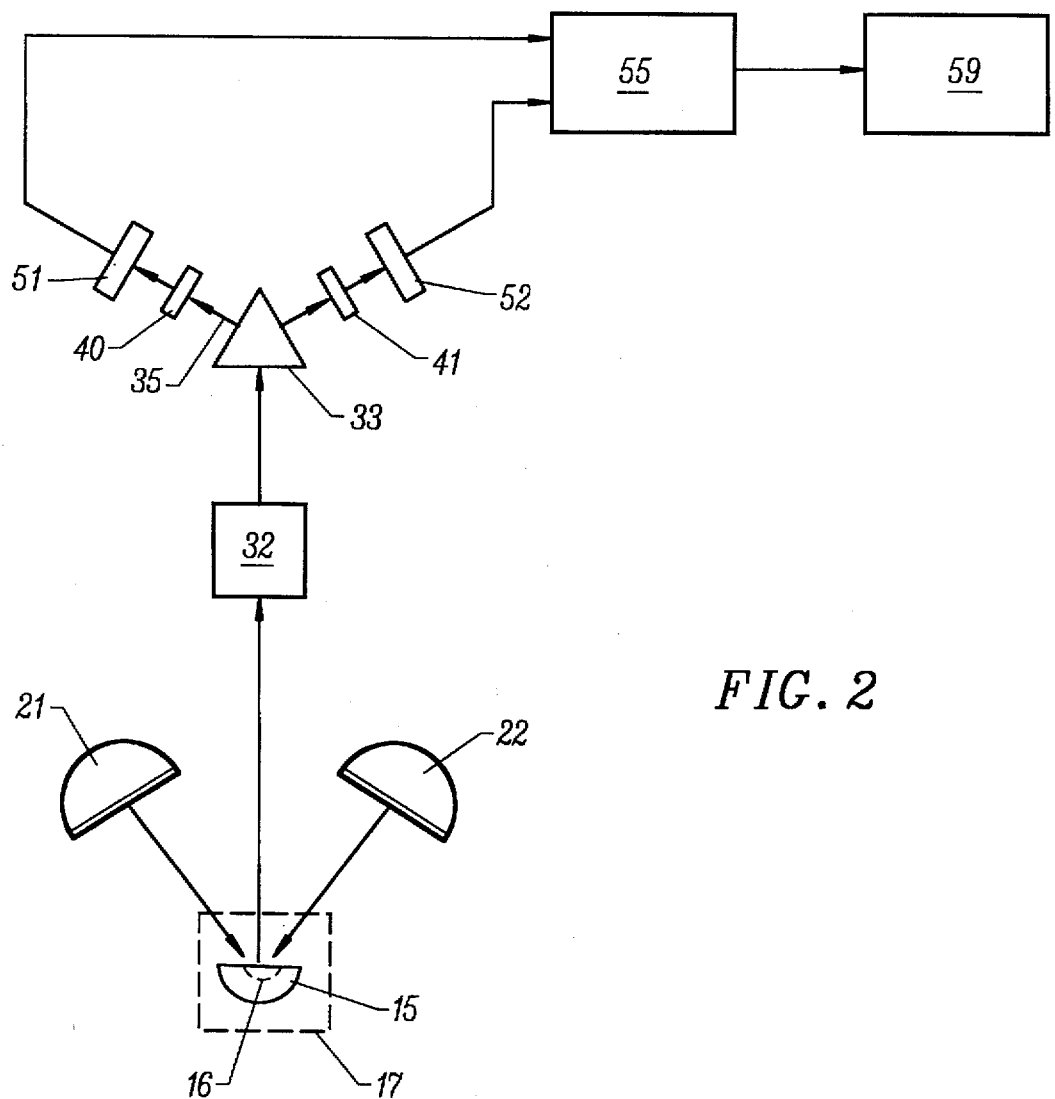
FIG. 2 is a schematic representation of the detection system of the present invention.

Referring the FIG. 2, a single pitted peach half 15 is shown in a "cup-up" position wherein the pit cavity 16 is directed upwardly and wherein pitted peach half 15 is in an inspection station or zone represented by the dotted lines 17. The conveyor which carries the pitted peach half 15 is not shown in FIG. 2 for purposes of clarity.

Illumination means 20 comprises a pair of quartz halogen lights each of 1,500 watts shown as 21 and 22. Lights 21 and 22 are kept on continuously during operation of the system. Light 21 is upstream of the inspection station 17 and is mounted above inspection zone or station 17 and is aimed downwardly at approximately a 60° angle from the horizontal. Light 22 is mounted downstream of the inspection station 17, is mounted above the station or zone 17 and is oriented downwardly at an angle of approximately 60° from the horizontal. By spacing apart the light sources 21 and 22, as shown and described, shadows inside the pit cavity 16 are minimized and ample light is diffusely reflected off of the pitted peach half and upwardly along the optical path 30 to present sufficient light to the sensors. The optical path utilized in the present invention is inherently "clear" in that juice and debris do not interrupt the optical path.

Light from the sources 21 and 22 is reflected off of the pitted peach half upwardly along optical path 30 through a lens system 32 and into a beam splitter 33. Beam splitter 33 may be a prism, filter wheel or other commercially available splitter. The beam splitter 33 separates the reflected light into a first beam 35 and a second beam 36.

First beam 35 enters a first filter means 40 which extracts a first wavelength band from the first beam. In the preferred embodiment, first filter means 40 allows a first wavelength band to pass through centered at 600 nm and having a bandwidth of 70 nm extending from 565 nm to 635 nm. Similarly, the second beam 36 passing out of beam splitter 33 enters a second filter means 41 which extracts a second wavelength band. In the preferred embodiment, the second wavelength band allowed to pass through the filter is centered at 750 nm and has a bandwidth of 70 nm extending from 715 nm to 785 nm. Wider wavelength bands up to about 100 nm centered at 600 nm and 750 nm will also perform, as well as narrower bandwidths down to 10 nm. According to the invention, both wavelength bands are filtered and imaged simultaneously and continuously during operation of the system.

The first wavelength band passing through the first filter means 40 enters a first line scan camera means 51 and the second wavelength band passing through filter means 41 enters a second line scan camera means 52. Both line scan camera means 51 and 52 are Dalsa line scan cameras model number CLC3-512 with lenses. Each of these cameras operates continuously and each camera has 512 pixels per line or two pixels per millimeter. Each pixel element creates a signal which is converted to a number between 0 and 255. We have found that by running three rows of pitted peach halves through the inspection station 17 simultaneously at a conveyor speed of 100 meters per minute, 45 peach halves per second are scanned and pit fragments as small as 2 mm$^2$ can be reliably detected. If no pitted peach half is in the inspection station or zone, the line scan cameras are essentially coasting and will not generate a significant signal.

The output of line scan cameras 51 and 52 is fed into image acquisition circuitry 55 where the pixel voltages are converted to numerical values. These numerical values are then fed to computer 59 and combined to enhance the resultant output.

The first method of enhancing the signal is done by subtracting the second image signal from the first image signal, that is subtracting the signal from the higher wavelength light band from the shorter wavelength light band. The second method of combining the image signals is accomplished by obtaining a ratio of the two signals wherein the output signal from the wavelength band centered at 750 nm is the numerator in the ratio and the image signal from the first image signal or the waveband centered at 600 nm is the denominator in the ratio.

Figure 3:
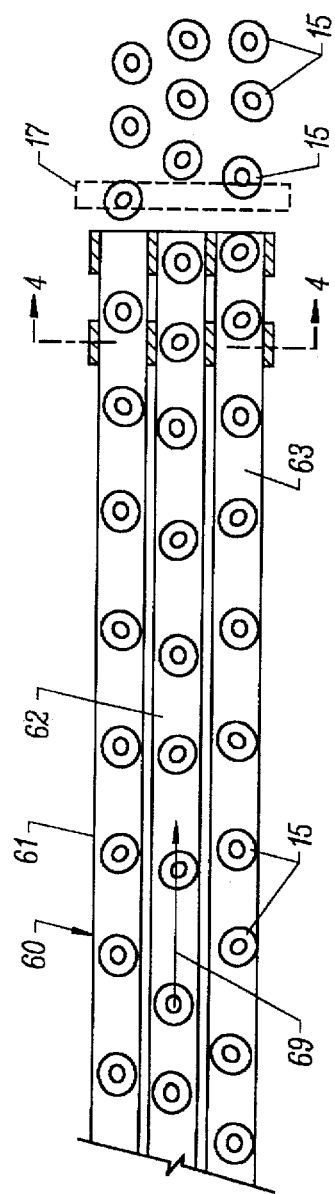
FIG. 3 is a top elevational view of a conveyor according to the present invention carrying peach halves toward the inspection station.
Figure 4:
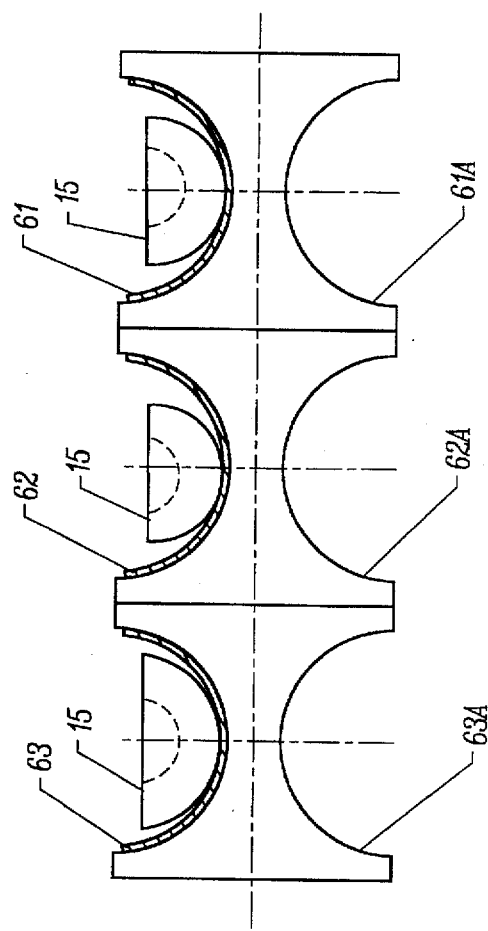
FIG. 4 is a section on the line 4—4 of FIG. 3.

FIGS. 3 and 4 show the conveyor means generally as 60 which comprises in the preferred embodiment a three row conveyor having longitudinal rows 61, 62 and 63. The transverse cross section of each of the rows is shown best in FIG. 4 and has a concave arcuate shape forming an elongated trough which extends longitudinally along the direction of travel of the conveyor means shown by arrow 69 in FIG. 3. In the preferred embodiment, the conveyor also has concave grooves formed on its lower surface shown as 61A, 62A and 63A. These concave grooves are supported by rollers not shown for clarity.

Figure 5:
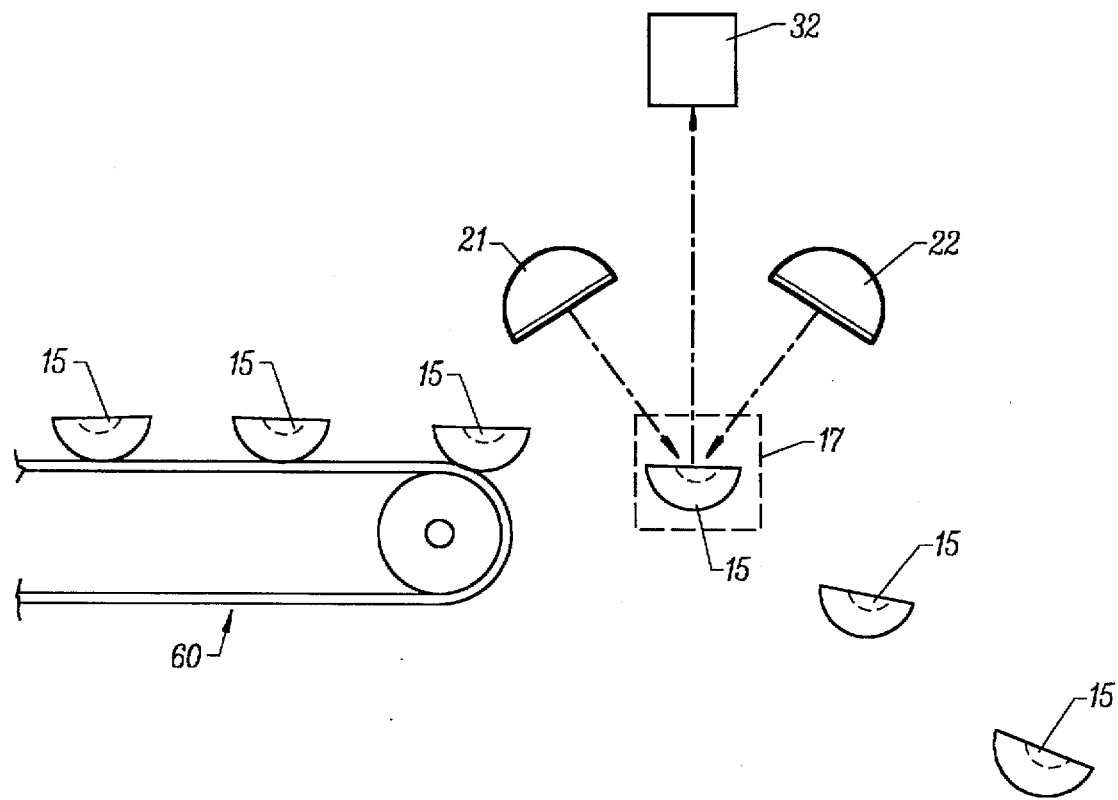
FIG. 5 is a side elevational view of peaches being launched off the end of the conveyor into the inspection zone.

As shown best in FIG. 5, the inspection zone or station 17 is downstream of and adjacent the end 67 of conveyor means 60 and at approximately the same vertical height as the surface of conveyor means 60. Peach halves 15 are launched off the end of conveyor means 60 into the inspection zone 17. By having the peach halves "airborne" while passing through the inspection zone 17, we avoid the generation of background signals which might otherwise be caused by the surface of the conveyor as well as debris, such as juice or peach flesh particles or pit particles, that might otherwise adhere to the surface of conveyor means 60. The conveyor means 60 operates at a sufficiently high speed to launch the peach halves into the inspection zone and to deliver a sufficient quantity of peaches per second to justify the cost of the system. The lens system 32 cooperates with the line scan camera means 51 and 52 (not shown in FIG. 5) to limit the field of view of the line scan cameras 51 and 52 so that essentially the only source of signals presented to the cameras is the peach halves in the inspection zone 17; we have effectively removed any background source of spurious signals from the inspection zone. Although the present invention would operate with an inspection zone on the conveyor, it is preferable to launch the peach halves off the conveyor into the inspection zone.

Figure 6:
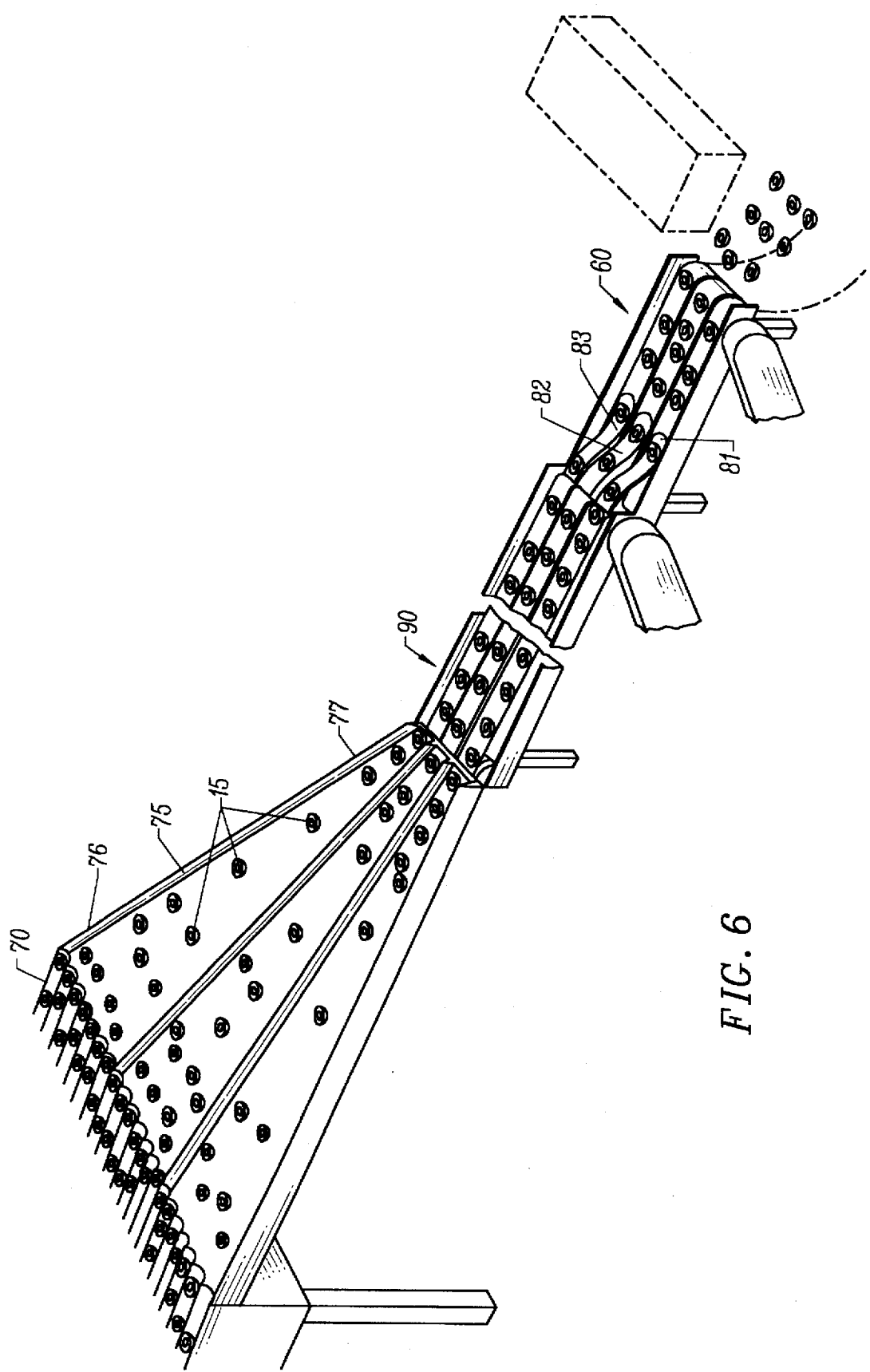
FIG. 6 shows a portion of the conveying system which transports peach halves from a cup-up shaker to the three row conveyor.
Figure 7:
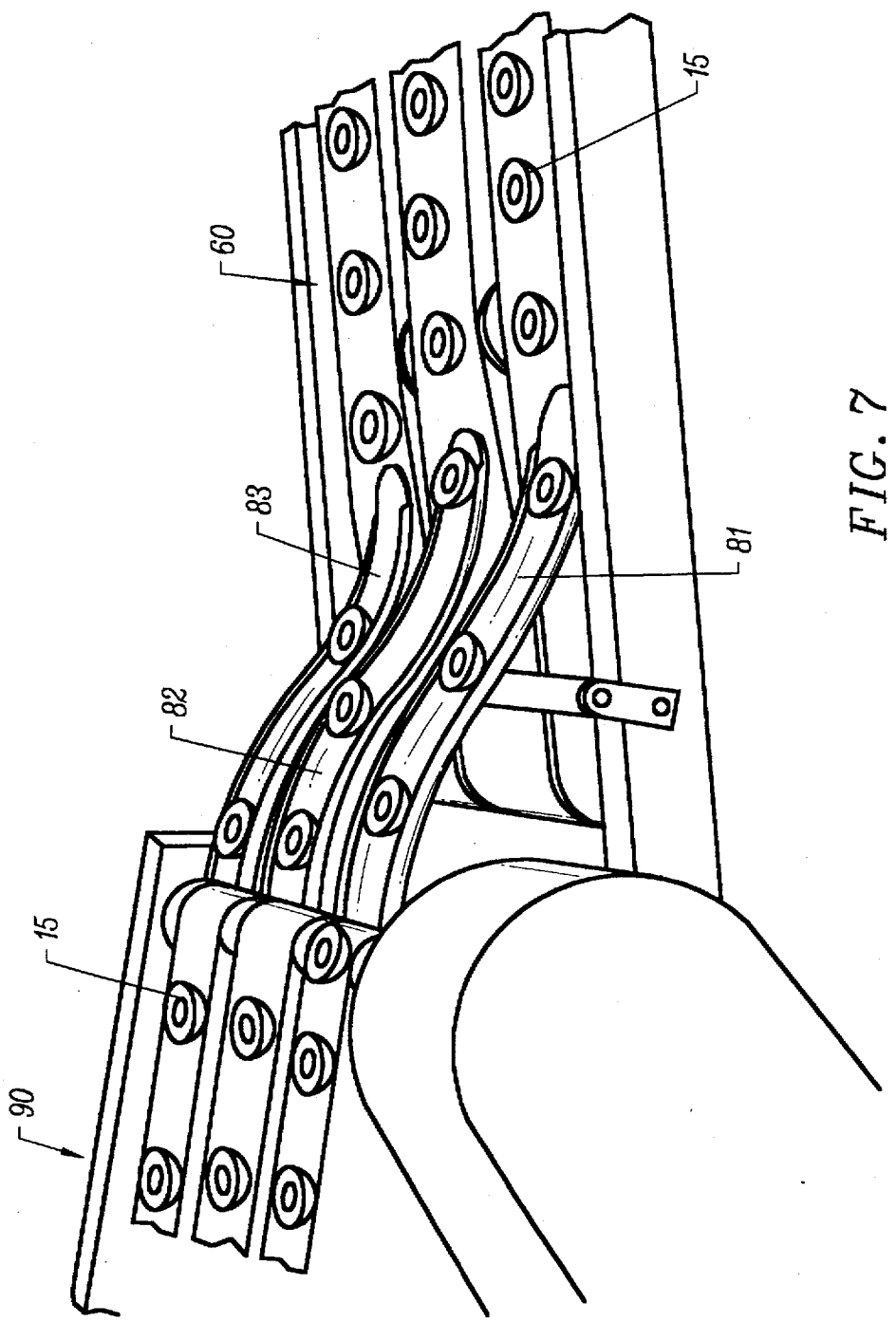
FIG. 7 shows in perspective and in greater detail a transition portion of the conveyor system.

FIGS. 6 and 7 show how the peaches are agitated into a cup-up position and how they are transported from the cup-up shaker to the three row conveyor means 60. As shown in FIG. 6, a commercially available cup-up shaker 70 is shown. This mechanism may be obtained from H. G. Molenaar, W.O. 9370, Paarl, South Africa. The shaker 70 uses an agitating bed to agitate the pitted peach halves until the heaviest side of the peach is oriented downwardly and the pit cavity is oriented upwardly.

A merging slide 75 having a generally triangular shape and downward slope receives the peaches from the output of the cup-up shaker and arranges the peaches into three rows for placement ultimately on the high speed conveyor means 60. The slide 75 receives 21 rows of peaches from the shaker 70 at its upper end 76 and merges those 21 output rows into three rows at its bottom portion 77.

An intermediate conveyor means 90 receives the peach halves from slide 75 and transports the peach halves to high speed conveyor means 60.

As shown best in FIG. 7, transition slides 81, 82 and 83 allow the cup-up peach halves to slide downwardly on their inclined surfaces onto the relatively high speed three row conveyor means 60.

It is understood that other types of conveyor mechanisms could be utilized in conjunction with the invention without departing from the spirit therefrom. It is also understood that various components of the invention disclosed and described herein may be modified without departing from the scope of the present invention.

What is claimed is:

1. A method of detecting the presence or absence of pit fragments in pitted peach halves comprising the steps:
    orienting pitted peach halves to a cup-up position on a conveyor,
    conveying said oriented pitted peach halves to an inspection station at a relatively high speed of up to 45 peach halves per second,
    continuously illuminating each of said peach halves at said inspection station to generate diffusely reflected light from the surface of each peach half,
    separating said reflected light into first and second beams,
    filtering said first beam to extract a first wavelength band,
    filtering said second beam to extract a second wavelength band,
    acquiring first and second image signals of each peach half from said first and second wavelength bands, respectively,
    combining said image signals from said first and second wavelength bands, and
    using said combined image signals to determine the presence or absence of pit fragments in each of said peach halves.

2. The method of claim 1 wherein said first wavelength band is from 550 nm to 650 nm and wherein said second wavelength band is from 700 nm to 800 nm.

3. The method of claim 2 wherein the combining of said image signals is done by subtracting said second image signal from said first image signal.

4. The method of claim 2 wherein the combining of said image signals is done by obtaining a ratio of said two signals, wherein said second image signal is the numerator and said first image signal is the denominator.

5. The method of claim 1 wherein said first wavelength band is centered at approximately 600 nm and has a bandwidth of approximately 70 nm and said second wavelength band is centered at approximately 750 nm and has a bandwidth of approximately 70 nm.

6. The method of claim 1 comprising the further steps of:
    conveying said pitted peach halves to a position adjacent to said inspection station at a relatively high speed, and
    launching said peach halves from said conveyor so they pass airborne through said inspection station.

7. The method of claim 6 wherein said peach halves are conveyed to the position adjacent to said inspection station at a rate of approximately 45 peach halves per second.

8. The method of claim 1 comprising the further step of simultaneously filtering said first beam and said second beam to extract said first and second wavelength bands.

9. A method of detecting the presence or absence of pit fragments in pitted peach halves comprising the steps:
    orienting pitted peach halves to a cup up position on a conveyor,
    conveying said oriented pitted peach halves to an inspection zone at a relatively high speed, said peach halves conveyed to a position adjacent said inspection zone at such a speed that said peach halves are launched from said conveyor and pass airborne through said inspection zone,
    illuminating each of said peach halves at said inspection station to generate diffusely reflected light from the surface of each peach half,
    providing a lens means focused on said inspection zone for receiving and transmitting reflected light only off of said peach halves,
    separating reflected light transmitted by said lens means into first and second beams,
    filtering said first beam to extract a first wavelength band,
    filtering said second beam to extract a second wavelength band,
    acquiring first and second image signals of each peach half from said first and second wavelength bands, respectively,
    combining said image signals from said first and second wavelength bands, and
    using said combined image signals to determine the presence or absence of pit fragments in each of said peach halves.

10. Apparatus for detecting the presence or absence of pit fragments in pitted peach halves as those pitted peach halves are passed through an inspection zone comprising:
    high speed conveyor means for conveying up to 45 pitted peach halves per second into said inspection zone,
    orienting means for orienting each of said pitted peach halves to a cup-up position prior to reaching said inspection zone,
    continuous illumination means for directing light at said pitted peach halves at said inspection zone and generating diffusely reflected light from the surface of each pitted peach half,
    beam splitting means for separating said reflected light into first and second beams,
    first filter means for extracting a first wavelength band from said first beam,
    second filter means for extracting a second wavelength band from said second beam,
    first and second line scan camera means for acquiring first and second image signals from said first and second wavelength bands, respectively, and
    means for combining said first and second image signals to determine the presence or absence of pit fragments in each of said pitted peach halves.

11. The apparatus of claim 10 wherein said conveyor means has an upper surface formed in the shape of one or more concave troughs which extend longitudinally along the direction of travel of said conveyor means.

12. The apparatus of claim 10 wherein said illumination means comprises first and second lights, said first light mounted upstream of and above said inspection zone and oriented at approximately a 60° angle from the horizontal, and said second light is mounted downstream of and above said inspection zone and oriented at approximately a 60° angle from the horizontal.

13. The apparatus of claim 10 wherein said first wavelength band is from 550 nm to 650 nm and wherein said second wavelength band is from 700 nm to 800 nm.

14. The apparatus of claim 10 wherein said first wavelength band is from 565 nm to 635 nm and wherein said second wavelength band is from 715 nm to 785 nm.

15. The apparatus of claim 10 wherein said conveyor means conveys said peach halves to a position adjacent to said inspection zone, said conveyor means conveying said peach halves at such a rate that said peach halves are launched from said conveyor means and pass airborne through said inspection zone in a plane parallel to said conveyor means.

16. The apparatus of claim 15 wherein said conveyor means comprises three separate rows capable of delivering three peach halves to said inspection zone simultaneously, wherein said conveyor means travels at 100 meters/minute, approximately 45 peach halves/sec. are presented to said inspection zone, and each of said line scan cameras has sufficient pixels to reliably detect pit fragments of 2 mm$^2$ and larger.

17. The apparatus of claim 15 further comprising a lens system coupled to said beam splitting means, said lens system focused on said inspection zone to receive and transmit reflected light only off said peach halves to said beam splitting means.

18. Apparatus for detecting the presence or absence of pit fragments in pitted peach halves as those pitted peach halves are passed airborne through an inspection zone comprising:

high speed conveyor means for conveying up to approximately 45 pitted peach halves per second to the end of said conveyor means located adjacent said inspection zone, said conveyor means conveying said peach halves at such a rate that said peach halves are launched from the end of said conveyor means into said inspection zone and pass through said inspection zone airborne, orienting means for orienting each of said pitted peach halves to a cup-up position prior to reaching said high speed conveyor means, illumination means for directing light at each of said pitted peach halves at said inspection zone and generating diffusely reflected light from the surface of each pitted peach half, lens means focused on said inspection zone to receive and transmit light reflected only off of the surface of each of said peach halves, beam splitting means for separating reflected light transmitted from said lens means into first and second beams, first filter means for extracting a first wavelength band from said first beam, second filter means for extracting a second wavelength band from said second beam, first and second line scan camera means for acquiring first and second image signals from said first and second wavelength bands, respectively, and means for combining said first and second image signals to determine the presence or absence of pit fragments in each of said pitted peach halves.

* * * * *